Aug. 23, 1960 W. G. PFANN 2,950,425
SEMICONDUCTOR SIGNAL TRANSLATING DEVICES
Filed Sept. 14, 1950 3 Sheets-Sheet 1

INVENTOR
W. G. PFANN
BY
ATTORNEY

Aug. 23, 1960 W. G. PFANN 2,950,425

SEMICONDUCTOR SIGNAL TRANSLATING DEVICES

Filed Sept. 14, 1950 3 Sheets-Sheet 2

INVENTOR
W. G. PFANN
BY
[signature]
ATTORNEY

Aug. 23, 1960 W. G. PFANN 2,950,425

SEMICONDUCTOR SIGNAL TRANSLATING DEVICES

Filed Sept. 14, 1950 3 Sheets-Sheet 3

INVENTOR
W. G. PFANN
BY
ATTORNEY 2,950,425

SEMICONDUCTOR SIGNAL TRANSLATING DEVICES

William G. Pfann, Basking Ridge, N.J., assignor to Bell Telephone Laboratories, Incorporated, New York, N.Y., a corporation of New York Filed Sept. 14, 1950, Ser. No. 184,870

36 Claims. (Cl. 317—235)

This invention relates to semiconductor signal translating devices and more particularly to such devices, now known as transistors, of the general type disclosed in the application Serial No. 33,466, filed June 17, 1948 of J. Bardeen and W. H. Brattain, now Patent 2,524,035, granted October 3, 1950.

Devices of the type disclosed in the application above identified comprise a semiconductive body having three connections, termed the base, emitter and collector, thereto. The base usually is a large area, substantially ohmic connection to the body. The emitter or collector, or both, may be point contacts as disclosed in the aforementioned application bearing against the body, or may be conductors, for example wires or strips, bonded to or embedded in the body as disclosed in the application Serial No. 184,869 filed September 14, 1950 of W. G. Pfann, now Patent No. 2,792,538. In one mode of operation of the devices, signals are impressed between the emitter and base and amplified replicas thereof appear in a load connected between the collector and base.

The semiconductive body may be of either conductivity type, N or P. The emitter usually is biased, relative to the body, in the forward or low impedance direction and the collector is biased, relative to the body, in the reverse or high impedance direction. Operation of the devices is explained upon the basis of the injection into the body, at the emitter, of charge carriers of the sign opposite that of those normally present in excess in the semiconductive body, and the collection of carriers at the collector. Specifically, in the case of a body of N conductivity type, the injected carriers are holes and in the case of a body of P conductivity type, the injected carriers are electrons. The injected carriers are attracted to the collector and modulate the collector current. It has been found that the change in collector current may be greater than the associated change in emitter current whereby an effective current multiplication or gain is realized. Also, inasmuch as the collector impedance may be greater than the emitter impedance, power gains are realizable even without the presence of a current multiplication.

A principal desideratum for an emitter is that it be efficacious for the injection of electrical carriers into the body; two principal desiderata for a collector are that it provide a relatively high impedance and result in a large current multiplication factor.

One general object of this invention is to improve the performance characteristics of semiconductor signal translating devices. More specific objects of this invention are to enhance the operating characteristics of the emitter or collector, or both, in transistors whereby improved performance of the transistor is realized, and to enable and facilitate the control of the emitter and collector characteristics thereby to achieve prescribed or optimum transistor performance.

The invention is predicated in part upon the discovery and determination that the performance of a transistor is markedly dependent upon the nature of the junctions between the semiconductive body and the emitter and collector, and more particularly upon the conductivity type of the regions or zones of the semiconductive body in immediate proximity to the emitter and collector. The invention involves also the discovery and determination that the nature of the junctions aforementioned and the performance by the emitter and collector of their respective functions can be selectively controlled by the introduction of impurities of particular types and in particular amounts into the semiconductive material in proximity to the connections.

One feature of this invention, then, involves the introduction of impurities of prescribed type and in particular quantity into the semiconductive body of a transistor, in the region of the emitter or collector or both.

In accordance with another and more specific feature of this invention, the introduction of impurities is effected by inclusion of the impurity or impurities in the emitter or collector material and treatment of the connection to introduce the impurity or impurities to or into the semiconductive body.

Although the invention will be described hereinafter with particular reference to translating devices including a body of germanium, it may be embodied also in devices utilizing other semiconductors, for example silicon. Also the invention is of general application, specifically to both emitters and collectors for both P and N type semiconductor devices and to emitters and collectors of both the contact and bonded or embedded types.

In general, in accordance with this invention, it has been found that a type of connection particularly suitable for the performance of the functions of an emitter in association with a semiconductive body of P conductivity type material is particularly useful also as a collector in association with a semiconductive body of N conductivity type material, a particularly important factor being that for these cases the connection contain material of the class known as donors. It appears further that an emitter advantageously useful in association with N-type bodies is particularly useful also as a collector in connection with P-type bodies, a particularly important factor being in this case that the connection contain a material of the class known as acceptors. It has been found further that certain connections and particularly collectors of the embedded type and to both P and N-type bodies, advantageously should contain both donor and acceptor materials whereby substantially optimum and controllable collector characteristics are realizable.

The absolute and relative amounts of the donor and acceptor materials, which are referred to commonly as significant impurity materials, determine the functional characteristics of the emitter and collector as will be discussed hereinafter and may be varied within limits to attain described or substantially optimum performance of the translating device. For example, both the input and output impedances can be controlled by controlling the impurity material concentration at the emitter and collector respectively and the current multiplication can be controlled by varying the impurity material concentration at the collector.

The specific compositions of the connections found especially desirable differ somewhat for the type of connector, that is pressure or embedded, used as will be discussed in detail hereinafter.

The invention and the above-noted and other features thereof will be understood more clearly and fully from the following detailed description with reference to the accompanying drawing in which.

Figure 1:
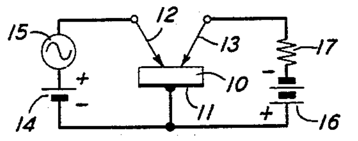
Fig. 1 is a diagram of a transistor including point or pressure type emitter and collector connections, illustrative of one type of device in which this invention may be embodied.

Referring now to the drawing, the amplifier illustrated in Fig. 1 comprises a body 10 of semiconductive material, for example germanium, a substantially ohmic base connection 11 to one face of the body, and emitter and collector point contacts 12 and 13 respectively bearing against the opposite face of the body. The emitter 12 is biased in the forward or low impedance direction by a source 14 in circuit with a source 15 of input signals; the collector 13 is biased in the reverse or high impedance direction by a source 16. When the body 10 is of N conductivity type, the polarities of the biasing sources are as indicated in Fig. 1; when the body 10 is of P conductivity type, these polarities will be the reverse of those indicated in Fig. 1. A load, represented by the resistor 17 is included in the collector circuit. In operation of the device, amplified replicas of signals from the input source 15 appear across the load 17.

Figure 5:
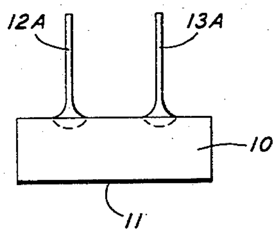
Fig. 5 is a diagram of a transistor of the embedded electrode type illustrative of another embodiment of this invention.

The semiconductive translating device illustrated in Fig. 5 is basically similar to that shown in Fig. 1 but the emitter and collector connections 12A and 13A respectively are bonded to or embedded in the semiconductive body 10 as in the manner described in the application of W. G. Pfann referred to hereinabove. The device illustrated in Fig. 5 may be operated in the same manner as the device shown in Fig. 1.

As has been noted hereinabove, the operation of an amplifier of the constructions depicted in Figs. 1 and 5 involves the injection of charge carriers into the body 10 at the emitter 12, the flow of the carriers to the collector 13 and modulation of the collector current in accordance with these carriers. Certain salient factors entering into the functioning of the emitter and collector will be appreciated from the following analysis with particular reference of Figs. 2, 3 and 4 which are energy level diagrams for junctions between a metal and an N conductivity type semiconductive body, specifically germanium. In these figures, CB denotes the bottom of the conduction band for the semiconductor, FB the top of the filled band and $E_F$ the Fermi level, and the P conductivity and N conductivity regions in the semiconductive body are designated P and N respectively. Junctions or barrier regions between two such regions of opposite conductivity types are indicated by the broken lines J and $J_1$. The diagrams are drawn in accordance with the convention whereby negative carriers, electrons, tend to move downwardly and positive carriers, holes, tend to move upwardly.

The connections between the body 10 and emitter and collector are generally asymmetric or rectifying. This is attributable to the existence at the metal-semiconductor interface of a potential barrier which may involve in some cases, a thin zone or region of conductivity type opposite that of the bulk of the body 10. When the body is of N conductivity type, as is the case depicted in Figs. 2, 3 and 4, the thin zone or region aforementioned is of P type, as denoted by the letter P in Figs. 2 and 3, and forms a junction or barrier J with the bulk of the body indicated as N.

Both types of carriers, that is both electrons and holes, may flow across the PN barrier or junction J. The relative magnitudes of the two currents will be dependent upon the energy level contours, and this in turn is dependent upon the conductivities of the P and N regions and the height of the potential barrier, $\Phi_s$, for electrons leaving the metal at the metal-semiconductor interface. The general form of the energy level contours and the relation thereof is as portrayed in Fig. 2.

Consider specifically, now, the case of a transistor comprising an N conductivity type germanium body. The emitter functions to inject positive carriers or holes into the body. Hence, a desideratum for the emitter connection is that holes flow readily from the metal to the semiconductor and across the junction J but that the flow of electrons be impeded. The requisite conditions for this are portrayed graphically in Fig. 3, to wit a relatively high barrier $\Phi_s$, high conductivity of the P zone or region (conductivity of the P zone is proportional to the factor $$e^{-\frac{\Delta E}{KT}}$$

where ΔE is the energy difference between the Fermi level and the top of the filled band) specifically a conductivity higher than that of the body material N, and a flattening of the energy level contours adjacent the metal-semiconductor interface. The desired low emitter impedance results, in part at least, from operation of the junction J in the forward direction.

Consider, now, the collector in a device employing a semiconductive body of N conductivity type. It functions to collect holes injected into the body at the emitter and flowing toward the collector region. As has been noted heretofore, advantageously the collector impedance is high and a desideratum is that current multiplication effects obtain. Current multiplication may be explained as due to the flow of electrons from the collector to the semiconductive body in response to the flow of holes from the body to the collector. Consistent with this, the collector-body junction should be of such nature as to facilitate passage of electrons from the collector into the body when holes from the emitter are present in the vinicity of the collector and to provide a high impedance when such holes are absent. The flow of electrons from the collector can be obtained by reducing the barrier $\Phi_s$ and the high impedance can be obtained by producing a P zone extending some distance within the semiconductive body from the collector. The conditions requisite for high impedance and large current multiplication effects at the collector may be established by the combination illustrated in Fig. 4, to wit a thin N type zone $N_1$, contiguous with the collector and a thin P type zone between the body bulk N and the zone $N_1$ and forming barriers or junctions J and $J_1$, respectively therewith. To be noted particularly are the low barrier $\Phi_s$, due to the zone $N_1$, leading to easy flow of electrons from the metal into the body and the higher conductivity of zone $N_1$ than that of zone P whereby more electrons than holes flow across junction $J_1$.

From similar analysis of the connections in a transistor including a P conductivity type body 10, and bearing in mind that in such device the carriers normally in excess in the body are holes and those injected at the emitter are electrons, it can be demonstrated that in general the conditions leading to a good collector on P type material are akin to those leading to a good emitter on N type material and that the conditions leading to a good emitter on P type material are analogous to those requisite for a good collector on N type material.

It is appreciated that the foregoing analysis is grounded in theoretical physics. Nevertheless, the results obtained in accordance with this invention are consistent with the theory and the latter provides a basis upon which the results may be explained. This will be apparent from a consideration of several specific examples of devices constructed in accordance with this invention.

Consider first the case of collectors in devices wherein the body is of N conductivity type germanium. In general, it has been found that particularly advantageous characteristics are realized for both pressure and bonded type connections when the collector wire contains a donor material and when, in addition and especially in the case of bonded connections, the collector wire includes also an acceptor material. The donor materials which may be used include phosphorus, arsenic and antimony; the acceptor materials which may be used include boron, aluminum, gallium, indium, gold and copper.

In the case of pressure type collectors on N germanium bodies, the collector containing no donor material, for example collectors of gold, copper and tungsten, it has been found that although the desired high impedance can be realized, the current multiplication factor, commonly designated as $\alpha$, is low and that no marked improvement can be realized even by subjecting the connection to a conventional electrical forming treatment. However, when a donor is included in the collector and the collector is formed electrically, relatively large values of $\alpha$ are obtained concomitantly with the desired high impedance.

The donor material may be alloyed with the major constituent of the collector wire or be present as a coating on the wire. The coating may be produced in any one of several ways, for example by dipping the wire in a reagent containing a donor or dipping the wire into a powder of the donor material. Illustrative of suitable alloys are those of gold and between about 0.001 percent and 0.1 percent antimony, and gold containing between about 0.001 percent and 0.1 percent phosphorus. Illustrative of suitable coated wires are gold, aluminum, tungsten and an alloy of platinum and 5 percent ruthenium coated by dipping the end of the wire into phosphoric acid or into a powder of red phosphorus or antimony.

Figure 2:
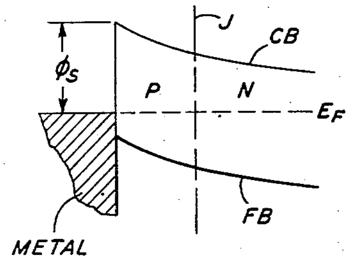
Figs. 2, 3 and 4 are energy level diagrams which will be referred to hereinafter in the discussion of emitter and collector functioning.

One effect of forming is to introduce impurities into the surface or the body of the semiconductor. For pressure type connections to an N germanium body, two cases or conditions are possible. In one, the P region, as depicted in Fig. 2, is present due to surface states. As a result of forming, donors are introduced at patches to produce N type regions and a configuration at the patches like that portrayed in Fig. 4 with the configuration at other than the patches like that shown in Fig. 2. In the other, a P zone is formed, as by thermal conversion or by diffusion of an acceptor inward, and a complete N zone like that represented at $N_1$ in Fig. 4 results from diffusion of the donor material. In both cases, an enhancement of the current multiplication factor is realized by virtue of the production of the zone $N_1$.

The advantageous conditions may be realized also by the sequential or simultaneous diffusion of acceptors and donors into the germanium body before the collector wire is brought to bear against the body. For example, an acceptor material such as gold or aluminum may be diffused, as from a coating on the surface, into a restricted surface portion of the germanium body to form the region or zone depicted at P in Fig. 4 and then a donor, such as phosphorus or antimony, may be diffused into this portion to produce the zone or region represented at $N_1$ in Fig. 4. The collector wire is brought to bear against the portion noted.

In a bonded or embedded type collector, the metal-semiconductor junction is largely internal and the area of contact is large in comparison to that for the case of pressure contacts. Attainment of the desired high collector impedance requires the presence of a barrier or junction between the embedded wire and the semiconductive body. This is achieved for a collector on N-type semiconductor by utilizing a collector wire containing an acceptor material. Some of this material diffuses into the N type body during the embedding of the wire or subsequent forming treatment, thereby to produce a P zone or region such as that indicated at P in Fig. 4 which forms a high impedance junction, J in Fig. 4, with the N type body. To enhance the current multiplication factor, $\alpha$, the embedded collector wire should include also a donor which also is diffused into the body. The donor results in formation of a zone or region such as indicated at $N_1$ in Fig. 4 with consequent reduction in the barrier $\Phi_s$.

The bonded wire may consist essentially of the donor and acceptor material, be composed of an inert base with which the donor and acceptor are alloyed, or one or both of the acceptor and donor may be present in a coating on the collector wire.

Illustrative of alloys especially useful as collector wire materials in bonded electrode type transistors wherein the semiconductive body is of N type germanium are those of gold containing a small proportion, specifically between about 0.0001 percent and about 1.0 percent antimony. As noted hereinabove, gold acts as an acceptor material and antimony is a donor material. In the fabrication of the bonded or embedded connection, both acceptor and donor materials diffuse into the germanium producing thereby an NPN condition of the type depicted in Fig. 4. It has been found that a collector of pure gold, although providing a high impedance as desired, results in low values of the current multiplication factor, $\alpha$, but that collectors of the gold-antimony alloys have not only high impedance but also increased $\alpha$.

Specifically, it has been found that as the antimony content is increased, the current multiplication factor increases and the collector impedance decreases. For example, in typical bonded electrode transistors utilizing a gold emitter and gold-antimony alloy collectors, it has been found that an increase in the antimony content from 0.0001 percent to 0.001 percent results in an increase of $\alpha$ of the order of 3 and a further increase to an antimony content of 0.01 percent results in an additional increase in $\alpha$ by a factor of about 2, all at substantially the same operating currents and voltages. For like increases in the antimony content, the collector impedance decreases by factors of about 3 and 25 respectively, for like operating currents and voltages. The marked decrease in collector impedance for increase in the antimony content from 0.001 to 0.01 percent is associated with a decrease in the forward current across the collector to body junction by a factor of about 12 (at 1 volt) and an increase in the reverse current by a factor of about 24 (at 1 volt). These data are explicable on the basis of Fig. 4 and the discussion thereof, to wit that as the antimony content increases, the zone or region $N_1$ is enhanced, as in area or conductivity, whereby the barrier $\Phi_s$ is reduced and the flow of electrons from the metal to the semiconductor is facilitated. In any event, it is an established fact that inclusion of both donor and acceptor materials in a bonded collector for N conductivity-type transistors results in particularly advantageous collector characteristics and transistor performance. Furthermore, it is evident that by varying the specific composition of the collector, both the collector impedance and the current multiplication factor can be controlled whereby the collector connection may be tailored for optimum performance in any particular application. In this connection, it may be noted that the absolute values of $\alpha$ and the collector impedance are amenable to controlled variation by control of the bond. Specifically, a light bond or shallow embedding of the collector in the germanium body provides a smaller area connection than a heavy bond or deep embedding, whereby the collector impedance is increased. Also, a light bond or shallow embedding, it has been found, leads generally to a higher $\alpha$.

As in the case of pressure type contacts, the donor and acceptor materials may be present in the form of a coating on the collector wire. They may be applied to the wire in the manners mentioned heretofore; they may be applied also by heating the wire in a vapor of the material. For example, a gold wire may be heated in a vapor of antimony or phosphorus whereby the donor is introduced into or coated upon the wire. In specific structures, heating of a gold wire at 300° C. for 15 minutes in antimony or phosphorus vapor has been found to include enough donor in the wire to markedly enhance the characteristics of the connection as a collector in both pressure and bonded or embedded electrode transistors.

Figure 3:
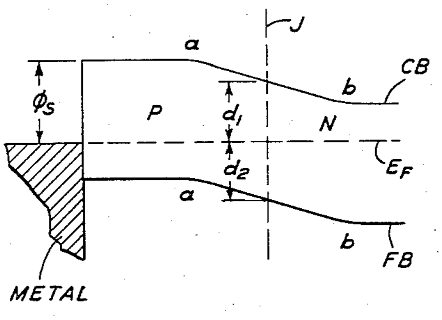
Figure 4:
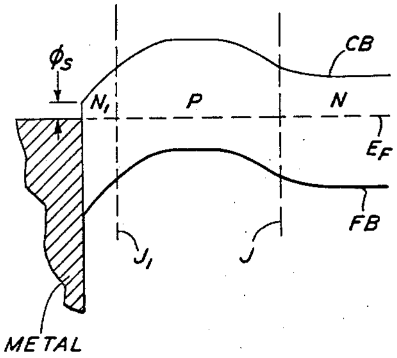

Turning now to the emitter for devices including an N conductivity type body, as has been set forth hereinabove the principal requirement therefore is that it be efficacious for the injection of holes into the body and this is consistent with the existence of a PN junction such as J in Fig. 3, a high value for $\Phi_s$ and a higher conductivity in the P region than in the N region of the body, on opposite sides of the junction J. In the case of a pressure type emitter, these conditions exist due to surface states. In the case of a bonded or embedded type emitter, the wire should consist of or contain an acceptor whereby the P zone adjacent the wire and the PN barrier or junction between it and the body may be produced during the bonding of the wire to the body.

The principal criterion for an emitter to a P conductivity type semiconductor body is that it permits the ready flow of electrons from the metal into the body. This connotes a low value of $\Phi_s$ as in the case of a collector connection to an N-type body and it has been found that, in general, advantageous P emitter characteristics are attained by the use of emitter wires containing or consisting largely of a donor material, some of this material being diffused to or into the P-type body by electrical forming, as in the case of pressure contacts, or during the bonding in the case of bonded or embedded type contacts.

In general, as has been noted hereinbefore, a good emitter for an N-type device can also be a good collector for a P-type device. Particularly advantageous P collector characteristics are realizable for conditions analogous to, but the reverse as to signs, those for an N-type collector. Specifically, the desideratum is an N conductivity zone about the collector and a P zone between the collector and the N zone. This may be achieved by utilizing a collector wire containing a large proportion of a donor material and a small proportion of an acceptor material. As an example, an alloy of an inert metal such as platinum, a proportion of phosphorus and a small proportion of aluminum may be used, for example platinum with 1 percent phosphorus and 0.1 percent aluminum. It will be appreciated that in devices utilizing a connection or connections including both donor and acceptor materials a number of factors are of particular moment in connection with the connection composition used. Among such factors are the relative amounts of the donor and acceptor materials, their diffusion constants into the semiconductor, their effectiveness as donors and acceptors—that is, the number of carriers produced per atom—and the alloy constitution diagrams having as components the semiconductive material and the materials of the connection. The underlying principles to be observed in providing any particular electrode composition will be appreciated from an analysis of the particular case of a collector connection to an N-conductivity type germanium body resulting in the configuration illustrated in Figure 4 and heretofore described. The purpose of the acceptor material is to produce the junction J which provides the high collector impedance. The purpose of the donor material is to produce the junction $J_1$ which is a P–N barrier between the collector and the P zone. It is desirable that the excess of donors in the region $N_1$ be greater than the excess of acceptors in the region P in order to assure a high value for the current multiplication factor $\alpha$.

In general the donor or acceptor material whose purpose is to produce high collector impedance may be termed a major impurity and the donor or acceptor whose purpose is to enhance the current multiplication factor $\alpha$ may be termed the minor impurity. Also, in general, the major impurity should be more readily diffusible into the semiconductive material than the minor material. A general criterion is that the product of the diffusibility and the amount of the major impurity should be greater than for the minor impurity. This criterion is satisfied in the specific example given hereinabove of an embedded collector connection to an N-type germanium body, the connection including gold and antimony, the gold constituting the major impurity and the antimony, the minor. Gold is readily diffusible into germanium, more so than antimony.

Figure 6:
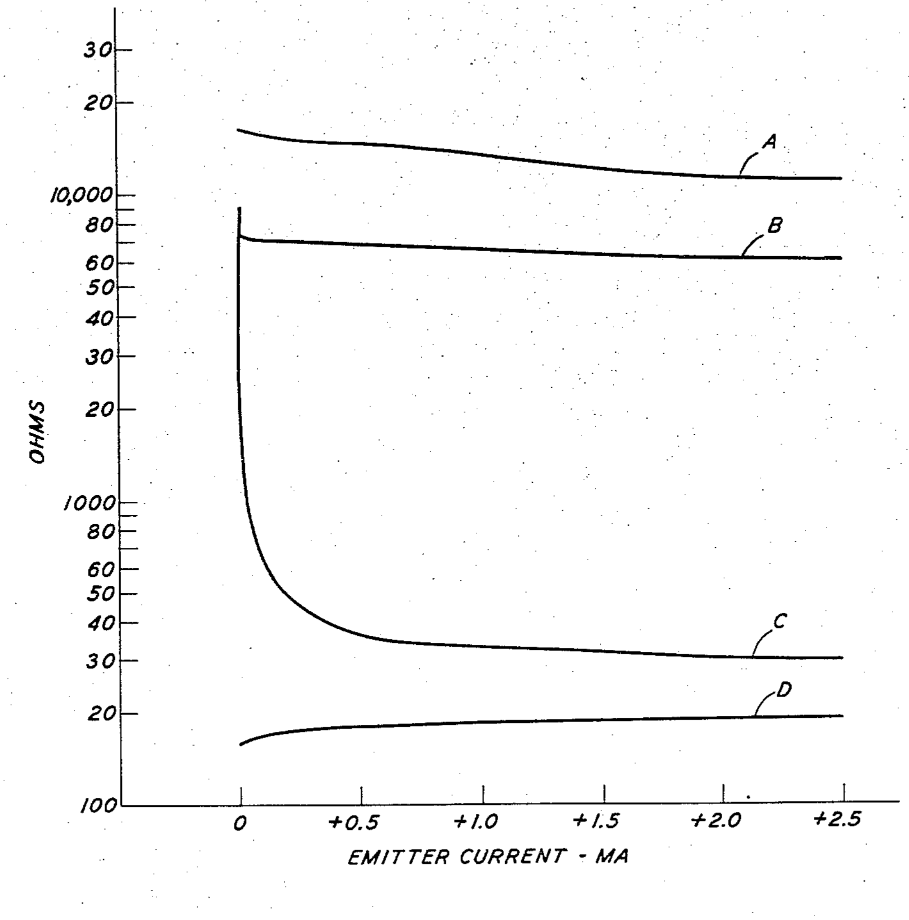
Figs. 6 and 7 are graphs depicting operating characteristics of typical transistors embodying features of and constructed in accordance with this invention.
Figure 7:
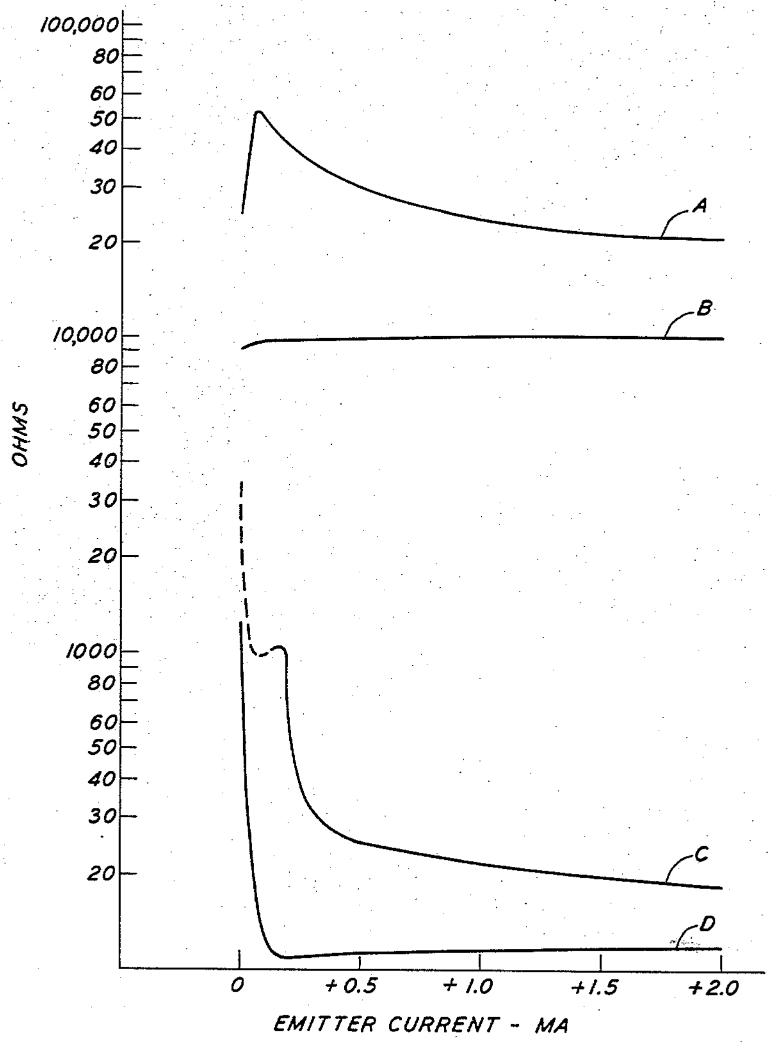

Small signal impedance characteristics of typical transistors constructed in accordance with this invention are portrayed in Figs. 6 and 7. The device having the characteristics of Fig. 6 included a body of high-back voltage, N conductivity type germanium and embedded emitter and collector, the emitter being of gold and the collector of an alloy of gold and 0.001 percent antimony. The device having the characteristics of Fig. 7 also was of the embedded electrode type, included a body of high-back voltage, N conductivity type germanium and a gold emitter but the collector was a phosphorus vapor treated gold wire fabricated as described hereinabove.

In both Figs. 6 and 7, curves C represent the input impedance, curves B the output impedance, curves A the mutual impedance associated with the collector and curves D the mutual impedance associated with the emitter, in accordance with a recognized convention of notation as disclosed for example in the Bell System Technical Journal, volume 28, No. 3, pages 370 et seq. The characteristics shown are for a collector bias of 20 volts, negative.

What is claimed is:

1. A signal translating device comprising a body of semiconductive material, a base connection to said body, and emitter and collector connections to said body, said emitter and collector connections being of different compositions, one including an acceptor material and the other a donor material.

2. A signal translating device comprising a body of semiconductive material containing a first impurity determining its conductivity type, and base, emitter and collector connections to said body, said emitter and collector connections being of different materials, said emitter connection containing an impurity of the type opposite that of said first impurity, and said collector connection containing an impurity of the same type as said first impurity.

3. A signal translating device comprising a body of semiconductive material containing a first impurity determining its conductivity type, and base, emitter and collector connections to said body, said emitter and collector connections being of different materials, said emitter connection containing a second impurity of the type opposite that of said first impurity, and said collector connection containing a major proportion of an impurity of the same type as said second impurity and a minor proportion of an impurity of the same type as said first impurity.

4. A signal translating device comprising a body of N conductivity type semiconductive material, base, emitter and collector connections to said body, said emitter and collector connections being of different compositions, said emitter connection containing an acceptor material and said collector connection containing a donor material.

5. A signal translating device comprising a body of N conductivity type semiconductive material, base, emitter and collector connections to said body, said emitter and collector connections being of different compositions, said emitter connection containing an acceptor as a major constituent and said collector connection containing an acceptor material as a major constituent and a donor material as a minor constituent.

6. A signal translating device comprising a body of N conductivity type germanium, a base connection to said body, a gold emitter connection to said body, and a collector connection comprising gold and a donor material, to said body.

7. A signal translating device comprising a body of P conductivity type semiconductive material, base, emitter and collector connections to said body, said emitter and collector connections being of different compositions, said emitter connection containing a donor material and said collector connection containing an acceptor material.

8. A signal translating device comprising a body of P conductivity type semiconductive material, base, emitter and collector connections to said body, said emitter and collector connections being of different compositions, said emitter connection containing a donor material and said collector connection containing a donor material as a major constituent and an acceptor material as a minor constituent.

9. A transistor comprising a body of semiconductive material containing a conductivity type determining impurity, a base connection to said body, and emitter and collector connections bonded to said body, said emitter and collector connections being of different compositions and both said emitter and collector connections containing, as a major component, a conductivity determining impurity of the class opposite that of said first impurity.

10. A transistor comprising a body of semiconductive material containing an impurity determining the conductivity type thereof, base and collector connections to said body, and an emitter bonded to said body, said emitter and collector connections being of different compositions and said emitter containing an impurity of the class opposite that of said conductivity type determining impurity.

11. A transistor comprising a body of semiconductive material containing an impurity determining the conductivity type thereof, base and emitter connections to said body, said emitter and collector connections being of different compositions and a collector bonded to said body and containing as a major element a material of the class opposite that of said impurity.

12. A transistor comprising a body of N conductivity type semiconductive material, a base connection to said body, and bonded emitter and collector connections to said body, said emitter and collector connections being of different compositions and both said emitter and collector connections containing an acceptor material as a major constituent.

13. A signal translating device comprising a body of N conductivity type semiconductive material, a base connection to said body, and bonded emitter and collector connections to said body, said emitter connection containing an acceptor material, and said collector connection containing an acceptor material as a major constituent and a donor material as a minor constituent.

14. A transistor comprising a body of N conductivity type germanium, emitter and base connections to said body, and a collector connection embedded in said body, said emitter and collector connections being of different compositions and said collector connection being of an alloy comprising gold as a major constituent and a donor material as a minor constituent.

15. A transistor comprising a body of N conductivity type germanium, emitter and base connections to said body, and a collector connection embedded in said body, said emitter and collector connections being of different compositions and said collector connection being of an alloy consisting essentially of gold containing between about 0.001 and 0.1 percent antimony.

16. A transistor comprising a body of P conductivity type semiconductive material, a base connection to said body, and bonded emitter and collector connections to said body, both said emitter and collector connections containing a donor material as a major constituent.

17. A transistor comprising a body of P conductivity type semiconductive material, base and emitter connections to said body, and a bonded collector connection to said body comprising an alloy containing both a donor and an acceptor material, the donor material being in excess of the acceptor material.

18. A transistor comprising a body of P conductivity type germanium, emitter and base connections to said body, and a collector embedded in said body, said body having therein a restricted N-type zone enclosing said collector and a thin acceptor containing region intermediate said zone and said collector.

19. The method of fabricating an electrical connection to a body of semiconductive material containing a conductivity type determining impurity, which comprises forming a coating of a second conductivity type determining impurity of the type opposite that of said first impurity upon the end of a wire which contains an impurity of the same type as said first impurity, placing the coated end in contact with the body, and treating the assembly to diffuse said impurities associated with said wire into said body simultaneously.

20. The method of making an electrical connection to a body of semiconductive material, which comprises forming a coating containing a donor material upon a wire containing an acceptor material, placing the coated wire in contact with the body, and treating the assembly to diffuse said donor and acceptor materials into the body simultaneously.

21. The method of making an electrical connection to a body of semiconductive material, which comprises forming a coating containing an acceptor material upon a wire containing a donor material, placing the coated wire in contact with the body, and treating the assembly to diffuse said donor and acceptor materials into the body simultaneously.

22. A signal translating device comprising a body of semiconductive material, and a connection to said body comprising a wire of an acceptor material having a coating of a donor material thereon.

23. A signal translating device comprising a body of semiconductive material, and a connection to said body comprising a wire of a donor material having a coating of an acceptor material thereon.

24. In the manufacture of a semiconductive body for a signal translating device, the method which comprises diffusing into a region of one conductivity type constituting a portion less than the whole of a semiconductive body an impurity characteristic of the opposite conductivity type, thereby to convert said region to the opposite conductivity type, and diffusing into a portion of said region constituting less than the whole thereof an impurity characteristic of said one conductivity type to produce in said portion of said region a zone of said one conductivity type.

25. In the manufacture of a semiconductive body for of signal translating device, the method which comprises diffusing into a region constituting a portion less than the whole of a semiconductive body of N conductivity type an acceptor impurity, thereby to convert said region to P conductivity type, and diffusing a donor impurity into a portion of said P type region constituting less than the whole thereof thereby to produce an N conductivity type zone therein.

26. In the manufacture of a semiconductive body for a signal translating device, the method which comprises diffusing into a region constituting a portion less than the whole of a semiconductive body of P conductivity type a donor impurity, thereby to convert said region to N conductivity type, and diffusing an acceptor impurity into a portion of said N type region constituting less than the whole thereof thereby to produce a P conductivity type zone therein.

27. In the manufacture of a semiconductive body, the method which comprises applying an element bearing an acceptor and a donor impurity to a portion of the surface of a semiconductive body of one conductivity type and treating the assembly to diffuse an effective quantity of one of said impurities into said body a limited distance, thereby producing a region in said body of the opposite conductivity type from said body, and simultaneously diffusing an effective quantity of the other of said impurities into said body a shorter distance than said one diffused impurity, thereby producing a portion in said body intermediate said region of opposite conductivity type and said element of said one conductivity type.

28. A semiconductor device suitable as an amplifier, oscillator or the like, said device comprising a body of N-type germanium, a base electrode in contact with said body, an emitter and a collector electrode in contact with said body said emitter and collector electrodes consisting each of a pointed metallic wire, said collector electrode containing at least one metal which will promote the flow of electrons from said collector electrode into said germanium body, said emitter electrode being substantially free of any metal which will promote the flow of electrons from said emitter electrode into said germanium body, whereby the flow of electrons from said germanium body into said emitter electrode is promoted.

29. A semiconductor device suitable as an amplifier, oscillator or the like, said device comprising a body of semiconductor material, a first electrode in low-resistance contact with said body, and second and third small-area wire electrodes in rectifying contact with said body, said second electrode being adapted to inject electrons into said body and containing at least one substance which promotes the flow of electrons from said second electrode into said body, said third electrode being adapted to receive electrons from said body and being substantially free of any of said substances which promote the flow of electrons from said third electrode into said body, whereby the flow of electrons from said body into said third electrode is promoted.

30. A semiconductor device suitable as an amplifier, oscillator or the like, said device comprising a body of N-type germanium, a base electrode in contact with said body, an emitter and a collector electrode in contact with said body said emitter and collector electrodes consisting each of a pointed metallic wire, said collector electrode containing at least one metal which will promote the flow of electrons from said collector electrode into said germanium body, said emitter electrode being substantially free of any metal which will promote the flow of electrons from said emitter electrode into said germanium body.

31. A semiconductor device suitable as an amplifier, oscillator or the like, said device comprising a body of semiconductor material, a first electrode in low-resistance contact with said body, and second and third small-area wire electrodes in rectifying contact with said body, said second electrode being adapted to inject electrons into said body and containing at least one substance which promotes the flow of electrons from said second electrode into said body, said third electrode being adapted to receive electrons from said body and being substantially free of any of said substances which promote the flow of electrons from said third electrode into said body.

32. A semiconductor device suitable as an amplifier, oscillator or the like, said device comprising a body of semiconductor material, a first electrode in low-resistance contact with said body, and second and third pointed wire electrodes in rectifying contact with said body, said second electrode being adapted to inject electrons into said body and containing at least one substance which promotes the flow of electrons from said second electrode into said body, said substance being of one member of the group consisting of phosphorus, arsenic, and antimony, said third electrode being adapted to receive electrons from said body and being substantially free of any element of said group, whereby the flow of electrons from said body into said third electrode is promoted.

33. A semiconductor device suitable as an amplifier, oscillator or the like, said device comprising a body of germanium, a first electrode in low-resistance contact with said body, and second and third pointed wire electrodes in rectifying contact with said body, said second electrode being adapted to inject electrons into said body and containing at least one substance which promotes the flow of electrons from said second electrode into said body, said substance being of one member of the group consisting of phosphorus, arsenic, and antimony, said third electrode being adapted to receive electrons from said body and being substantially free of any element of said group, whereby the flow of electrons from said body into said third electrode is promoted.

34. A semiconductor device suitable as an amplifier, oscillator or the like, said device comprising a body of semiconductor material, a first electrode in low-resistance contact with said body, and second and third small-area wire electrodes in rectifying contact with said body, said second electrode being adapted to inject electrons into said body and containing a donor material, an electroformed region in said body contiguous with said second electrode, said third electrode being adapted to receive electrons from said body and being substantially free of any substance which will promote the flow of electrons from said third electrode into said body.

35. A semiconductor device suitable as an amplifier, oscillator or the like, said device comprising a body of semiconductor material, a first electrode in low-resistance contact with said body, and second and third small-area wire electrodes in rectifying contact with said body, said second electrode being adapted to inject electrons into said body and containing a donor material, said third electrode being adapted to receive electrons from said body and being substantially free of any substance which will promote the flow of electrons from said third electrode into said body.

36. In a point contact semiconductor device, the combination comprising: a monatomic semiconductor specimen having first and second surfaces; a resilient whisker element engaging said first surface of said specimen, said whisker element having a central region and a surface region surrounding said central region, one of said regions consisting essentially of a resilient metallic material, the other of said regions consisting essentially of an active impurity of the acceptor type and said resilient metallic material; a connecting electrode in ohmic contact with said second surface of said specimen; and a rectifying junction within said specimen and between said connecting electrode and said other region of said whisker element.

References Cited in the file of this patent

UNITED STATES PATENTS

| | | |
|---|---|---|
| 817,664 | Plecher | Apr. 10, 1906 |
| 2,502,479 | Pearson et al. | Apr. 4, 1950 |
| 2,524,035 | Bardeen et al. | Oct. 3, 1950 |
| 2,560,594 | Pearson | July 17, 1951 |
| 2,623,102 | Shockley | Dec. 23, 1952 |